US008068998B2

(12) United States Patent
Mitsutake (10) Patent No.: US 8,068,998 B2
(45) Date of Patent: Nov. 29, 2011

(54) ELECTROMAGNETIC FLOWMETER

(75) Inventor: Ichiro Mitsutake, Tokyo (JP)

(73) Assignee: Yamatake Corporation, Tokyo (JP)

( * ) Notice: Subject to any disclaimer, the term of this patent is extended or adjusted under 35 U.S.C. 154(b) by 382 days.

(21) Appl. No.: 12/268,545

(22) Filed: Nov. 11, 2008

(65) Prior Publication Data
US 2009/0120204 A1    May 14, 2009

(30) Foreign Application Priority Data

Nov. 13, 2007  (JP) ................................. 2007-294066

(51) Int. Cl.
*G01F 1/60* (2006.01)
(52) U.S. Cl. ............. 702/45; 702/50; 702/100; 702/38; 73/861.17; 73/861.12; 73/861.16; 324/306; 324/307; 324/309
(58) Field of Classification Search .................... 702/50, 702/100, 38, 45; 73/861.17, 861.15, 861.02, 73/861.08, 861.09, 861.11, 861.13, 861.12, 73/861.16, 861.04, 700, 735, 1.16, 861; 324/306, 324/307, 309
See application file for complete search history.

(56) References Cited

U.S. PATENT DOCUMENTS

| 3,783,687 A * | 1/1974 | Mannherz et al. ......... 73/861.17 |
| 3,965,738 A * | 6/1976 | Watanabe ................... 73/861.17 |
| 4,010,644 A * | 3/1977 | Bonfig et al. .............. 73/861.17 |
| 4,373,400 A * | 2/1983 | Sekiguchi .................. 73/861.12 |
| 4,644,799 A * | 2/1987 | Tomita ....................... 73/861.12 |
| 4,709,583 A * | 12/1987 | De Paepe et al. .......... 73/861.17 |
| 4,856,345 A * | 8/1989 | Mochizuki ................. 73/861.17 |
| 5,388,465 A | 2/1995 | Okaniwa et al. |
| 5,394,023 A | 2/1995 | Gleim et al. |
| 5,443,552 A * | 8/1995 | Tomita ....................... 73/861.17 |
| 5,646,353 A * | 7/1997 | Mesch et al. ............... 73/861.16 |
| 6,845,330 B2 * | 1/2005 | Okuda et al. ..................... 702/38 |
| 6,847,901 B2 * | 1/2005 | Suzuki et al. ................... 702/38 |
| 6,937,943 B2 * | 8/2005 | Budmiger ....................... 702/45 |
| 7,369,949 B2 * | 5/2008 | Yamamoto ...................... 702/45 |

FOREIGN PATENT DOCUMENTS

| JP | 56-107123 A | 8/1981 |
| JP | 62-34083 B | 7/1987 |
| JP | 04-340423 A | 11/1992 |
| JP | 05-113358 A | 5/1993 |
| JP | 07-9374 B | 2/1995 |
| JP | 2000-046606 A | 2/2000 |

OTHER PUBLICATIONS

European Search Report dated Feb. 11, 2009 appended to EP 2 060 878 A1, which is the E.P. counterpart to the instant U.S. Appl. No. 12/268,545.

* cited by examiner

*Primary Examiner* — Carol Tsai
(74) *Attorney, Agent, or Firm* — McDermott, Will & Emery LLP (57) ABSTRACT

An electromagnetic flowmeter that prevents fluctuations in the frequency of synchronized pulse signals due to momentary fluctuations of the power source voltage. The comparator of an AC synchronizing circuit that generates pulse signals synchronized to the frequency of a commercial power source is given a hysteresis function in which a first threshold value Vth1 and a second threshold value Vth2 are set up in the comparator. The comparator compares the level of divided AC signals from a dividing circuit with the first threshold value Vth1, and if the level of the divided AC signals exceeds the first threshold value Vth1, the level of the synchronized pulse signals is inverted from the "L" level to the "H" level; and if the level of the divided AC signals falls below the second threshold value Vth2, the level of the synchronized pulse signals is inverted from the "H" level to the "L" level.

4 Claims, 10 Drawing Sheets

Fig. 11A
DIVIDED AC SIGNAL

Fig. 11B
COMPARATOR OUTPUT SIGNAL(SYNCHRONIZED PULSE SIGNAL)

ELECTROMAGNETIC FLOWMETER

The present application claims priority of Japanese patent application No. 2007-294066, which was filed in the Japanese Patent Office on Nov. 13, 2007 and which is incorporated by reference herein in its entirety.

FIELD OF THE INVENTION

The present invention relates to electromagnetic flowmeters, and more particularly to an electromagnetic flowmeter in which the AC frequency of a commercial power source clocks both the rate at which the current in the exciting coil is switched and the rate at which flow rate signals are sampled between the signal electrodes.

BACKGROUND OF THE INVENTION

There is known an electromagnetic flowmeter comprising an exciting coil to create a magnetic field orthogonal to the direction of fluid flow running inside a measurement tube and signal electrodes provided inside the measurement tube. In such a device, the electromotive force generated across the electrodes by the flow of fluid through the measurement tube can be used to determine the fluid flow rate.

Figure 8:
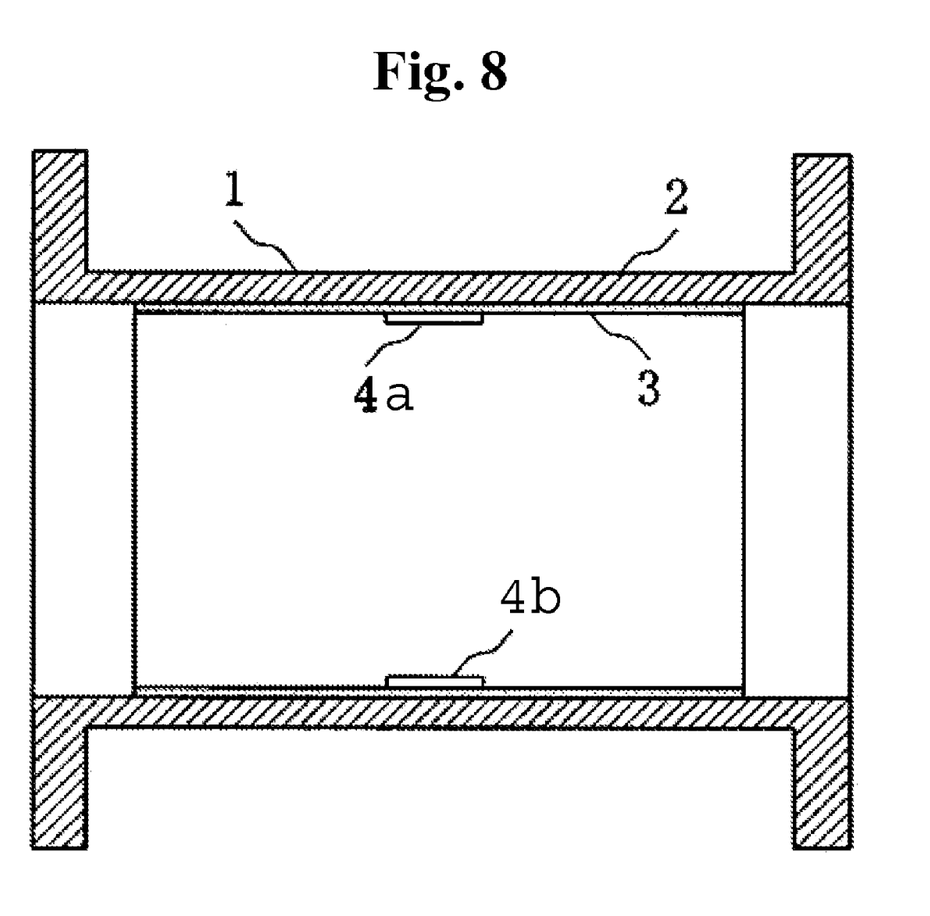
FIG. 8 is a diagram indicating the essential parts of a conventional electromagnetic flowmeter.

The essential parts of a conventional electromagnetic flowmeter are indicated in FIG. 8. In this diagram, a measurement tube 1 comprises a non-magnetic metal pipe 2 (for example, non-magnetic stainless steel pipe) and a lining 3 based on an insulative resin formed on the inside of the non-magnetic metal pipe 2. 4a and 4b are facing signal electrodes provided on the inner peripheral surface of the measurement tube 1.

Further, although not indicated in FIG. 8, an exciting coil that creates a magnetic field is provided orthogonally to the direction of flow of the fluid that flows inside the measuring tube 1, and the facing signal electrodes 4a and 4b are provided orthogonally to the magnetic field that this exciting coil creates (see, e.g., Japanese examined patent application No. 7-9374 of Hei et al., hereinafter "Hei.")

As indicated in Hei, this electromagnetic flowmeter comprises an AC synchronous circuit that generates pulse signals synchronized to the frequency of the commercial power source. The exciting current supplied to the exciting coil and the rate at which flow rate signals are sampled between the signal electrodes are both clocked by the pulse signals generated by this AC synchronizing circuit.

Figure 9:
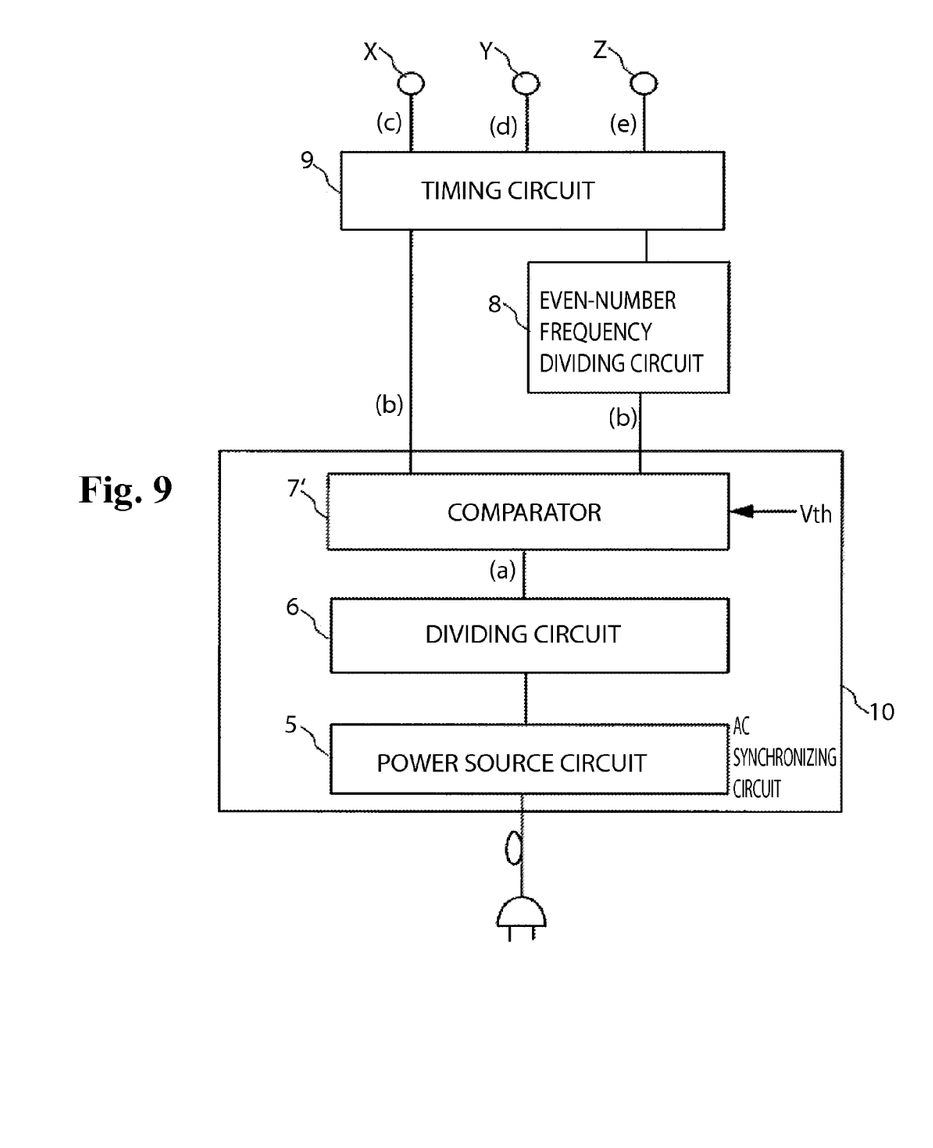
FIG. 9 is a diagram illustrating the circuit configuration that includes an AC synchronizing circuit of an electromagnetic flowmeter indicated in Hei.

FIG. 9 illustrates the configuration of a circuit that includes the AC synchronizing circuit described in Hei. In this diagram, 5 is a power source circuit, 6 is a dividing circuit, 7 is a comparator, 8 is an even-number frequency divider and 9 is a timing circuit. The AC synchronizing circuit 10 is composed of the power source circuit 5, the dividing circuit 6 and the comparator 7. In this circuit configuration, a single threshold value Vth is set up in the comparator 7. The pulse signal, which the AC synchronizing circuit 10 generates and which is synchronized to the frequency of the commercial power source, will be referred to as the "synchronized pulse signal" throughout the remainder of this application.

FIGS. 10(a)-10(e) illustrate the signal waveforms for the circuit configuration in FIG. 9. In the circuit configuration indicated in FIG. 9, AC signals input from the commercial power source are sent to the dividing circuit 6 through the power source circuit 5, where they are divided by the dividing circuit 6 and made into divided AC signals (FIG. 10(a)). The divided AC signals are sent to the input of the comparator 7. The comparator 7 monitors the level of the divided AC signals. If the level of a divided AC signal exceeds the threshold value Vth, that signal is inverted from the "L" level to the "H" level. If the level of a divided AC signal falls below the threshold value Vth, that signal is inverted from the "H" level to the "L" level. A synchronized pulse signal like that indicated in FIG. 10(b) can thereby be obtained as an output signal from the comparator 7.

Figure 10A:
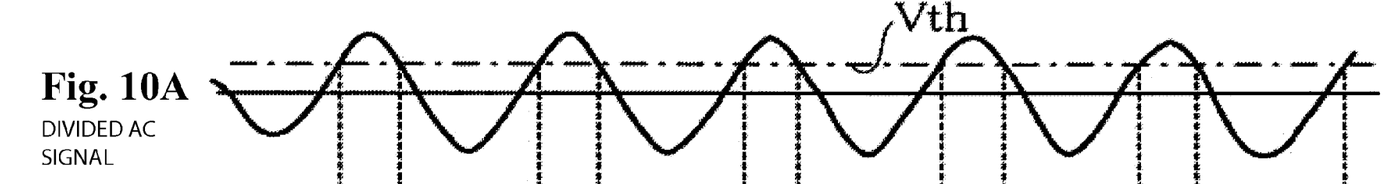
FIGS. 10(a)-10(e) are diagrams illustrating the signal waveforms of the various parts of the circuit configuration indicated in Hei.
Figures 10B, 10C:
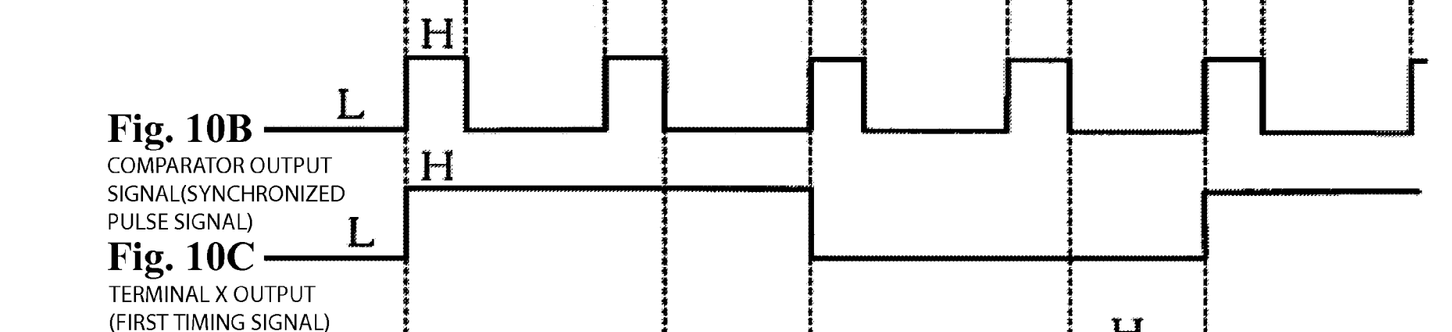
Figure 10D:
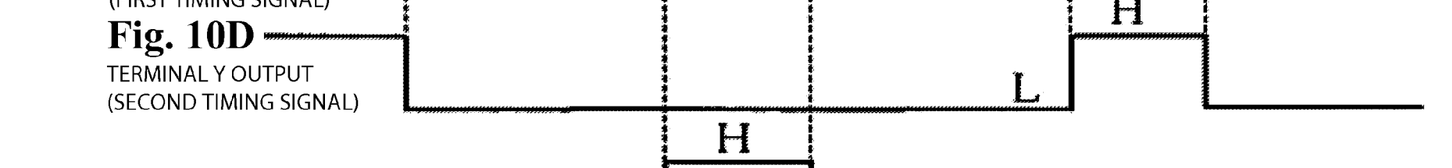
Figure 10E:
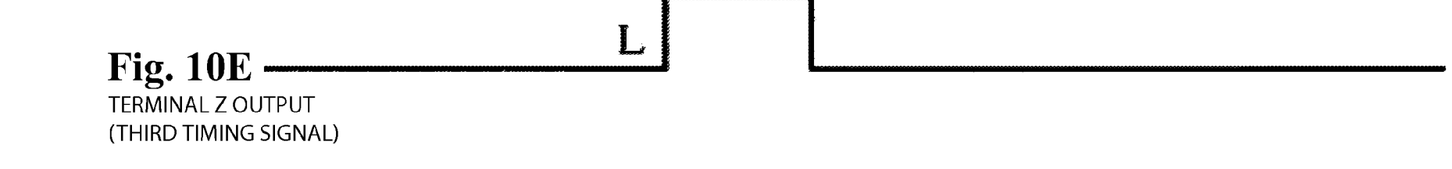

Some of these synchronized pulse signals are directly output to the timing circuit 9, and others are frequency-divided in even-number multiples by the even-number frequency dividing circuit 8, and are then output to the timing circuit 9. As a result, as indicated in FIG. 10(c), the frequency-divided synchronized pulse signals from the even-number frequency dividing circuit 8 are output unchanged as first timing signals from a terminal X of the timing circuit 9, and the direction of the exciting current to the exciting coil is switched based on these first timing signals. Moreover, signals like those indicated in FIG. 10(d) are output from a terminal Y of the timing circuit 9 as second timing signals; signals like those indicated in FIG. 10(e) are output from a terminal Z of the timing circuit 9 as third timing signals; and flow rate signals produced between the signal electrodes 4 are sampled based on these second and third timing signals.

Figure 11A:
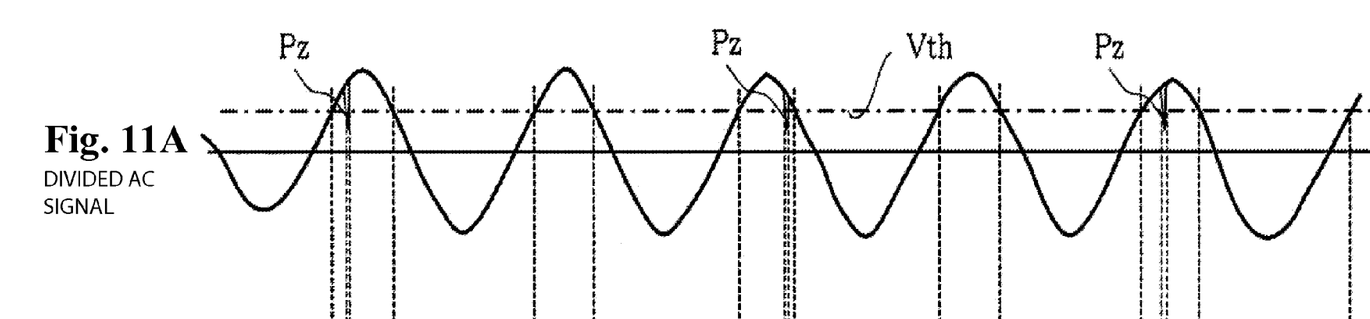
FIG. 11 is a diagram illustrating the waveforms of the divided AC signals to the comparator and of the output signals (synchronized pulse signals) from the comparator when momentary fluctuations of the power source voltage are produced in the AC signals input from the commercial power source in the circuit configuration indicated in FIG. 9.
Figure 11B:
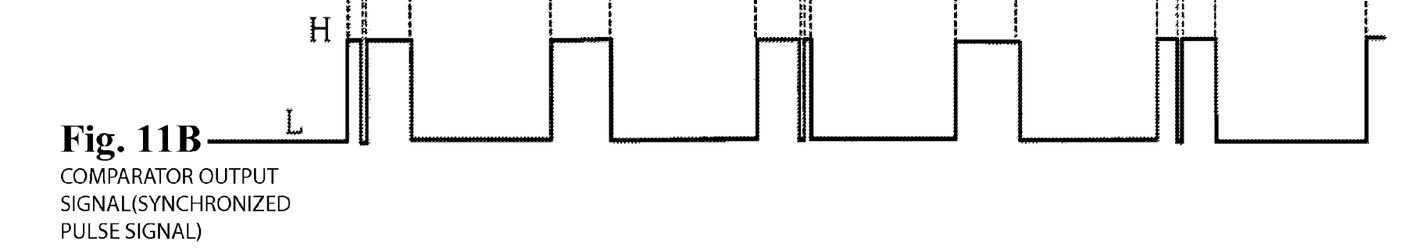

Nonetheless, in the conventional electromagnetic flowmeter described above, momentary power source voltage fluctuations are generated by the AC signals input from the commercial power source. For example, as indicated by the code Pz in FIG. 11(a), if the level of the divided AC signal sent to the comparator 7 momentarily changes up and down while at the threshold value Vth, this change is judged to be one waveform of the divided AC signal, and an extra pulse number is generated (refer to FIG. 11(b)). Therefore, the frequency of the synchronized pulse signal will fluctuate. In this case, the first to third timing signals, which take the synchronized pulse signals as a standard, also fluctuate, and a discrepancy is generated between the timing for switching the direction of the exciting current to be supplied to the exciting coil and the timing for sampling the flow rate signals generated between the signal electrodes 4. As a result, the device cannot render accurate flow rate measurements.

Therefore, there is a need for electromagnetic flowmeters that can accurately measure flow rate without producing fluctuations in the frequency of the synchronized pulse signals.

SUMMARY OF THE INVENTION

In view of the limitations associated with the design of traditional electromagnetic flowmeters, an embodiment of the present invention provides an electromagnetic flowmeter comprising an exciting coil that creates a magnetic field orthogonal to the direction of fluid flow inside a measurement tube 1, signal electrodes 4a and 4b provided in the measurement tube facing orthogonally to the magnetic field that this exciting coil creates, and an AC synchronizing circuit 10 that generates pulse signals synchronous to the frequency of the commercial power source. In this embodiment, both the switching rate of the exciting current in the exciting coil and the rate at which flow rate signals are sampled between the signal electrodes are controlled by the pulse signals that the AC synchronizing circuit 10 produces as the standard. The AC synchronizing circuit comprises a dividing circuit 6 that divides the AC signal from the commercial power source into divided AC signals and a comparator 7 that monitors the level of the divided AC signals. If the level of a divided AC signal exceeds a pre-stipulated first threshold value, the comparator 7 inverts the synchronized pulse signals from a first level to a second level. If a divided AC signal falls below a second threshold value, which is lower than the first threshold value, the comparator 7 inverts the signal from the second level back to the first level.

In this way, after the level of the divided AC signal exceeds the first threshold value and the level of the synchronized pulse signal is inverted from the first level to the second level, if the level of the divided AC signal does not thereafter fall below the second threshold value, which is lower than the first threshold value, the level of the synchronized pulse signal will not be inverted from the second level to the first level. Moreover, after the level of the divided AC signal falls below the second threshold value and the level of the synchronized pulse signal is inverted from the second level to the first level, if the level of the divided AC signal does not thereafter exceed the first threshold value, which is higher than the second threshold value, the level of the synchronized pulse signal will not be inverted from the first level to the second level. Therefore, if the difference between the first threshold value and the second threshold value is made to be large, minor fluctuations of the power source voltage will not erroneously switch the level of the synchronized pulse signals.

In one embodiment, the levels of the divided AC signal from the dividing circuit are immediately compared by the comparator, but it is also possible to provide a full-wave rectifying circuit that full-wave rectifies the divided AC signals. In such an embodiment, the rectified signals are then sent to the comparator, which compares the levels of the full-wave rectified signals. In this case, the comparator monitors the level of full-wave rectified signals from this full-wave rectifying circuit, and if the level of the full-wave rectified signals exceeds a pre-stipulated first threshold value, the levels of the pulse signals (synchronized pulse signals) are inverted from the first level to a second level, and if the full-wave rectified signals fall below the second threshold value, which is lower than the first threshold value, the level of the pulse signals (synchronized pulse signals) are inverted from the second level to the first level.

In a further embodiment, the AC synchronizing circuit includes a low-pass filter which removes from the divided AC signals that are sent to the comparator 7 any signal components of a higher frequency than the frequency of the commercial power source. Signals with a frequency higher than the frequency of the commercial power source (high frequency noise) can thereby be removed by the low pass filter prior to input into the comparator.

In another embodiment, the AC synchronizing circuit includes a low-pass filter which removes from the full-wave rectified signals that are sent to the comparator 7 any signal components of a higher frequency than the frequency of the commercial power source. Signals with a frequency higher than the frequency of the commercial power source (high frequency noise) can thereby be removed by the low pass filter prior to input into the comparator.

In another embodiment, the comparator of the AC synchronizing circuit monitors the level of the divided AC signals (full-wave rectified signals), and if the level of the divided AC signals (full-wave rectified signals) exceeds the first threshold value, the level of the synchronized pulse signals are inverted from the first level to a second level, and if the divided AC signals (full-wave rectified signals) fall below the second threshold value, which is lower than the first threshold value, the level of the synchronized pulse signals are inverted from the second level to the first level

BRIEF DESCRIPTION OF THE DRAWINGS

The foregoing and other features of the present invention will be more readily apparent from the following description and drawings of the illustrative embodiments of the invention, wherein like reference numbers refer to similar elements throughout and in which.

DETAILED DESCRIPTION OF THE EMBODIMENTS

Structure and Operation of a First Embodiment

Figure 1:
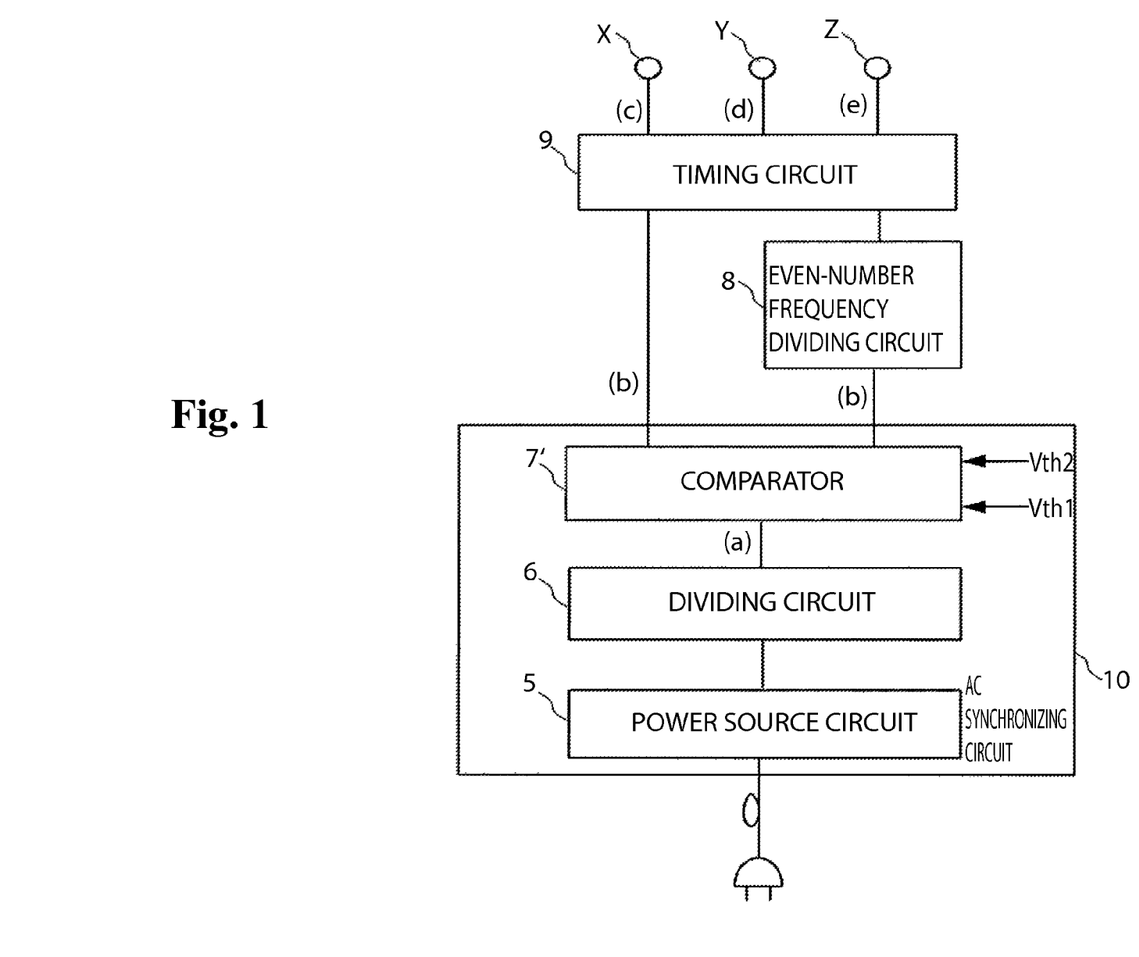
FIG. 1 is a diagram indicating an example of a circuit configuration that includes an AC synchronizing circuit of an electromagnetic flowmeter related to the present invention.

To illustrate the basic concept, FIG. 1 shows a first embodiment of the present invention including the AC synchronizing circuit of an electromagnetic flowmeter. The codes in this diagram that are the same as those in FIG. 9 indicate the same or equivalent configurational elements as those explained while referring to FIG. 9, and redundant explanation will be omitted. In this first embodiment, the comparator is a comparator 7' having a hysteresis function, a first threshold value Vth1 and a second threshold value Vth2, which is lower than the first threshold value Vth1.

FIGS. 2(a)-2(e) illustrate the signal waveforms of the various parts in FIG. 1. In the circuit configuration indicated in FIG. 1, AC signals input from the commercial power source are sent to the dividing circuit 6 through the power source circuit 5, are divided by the dividing circuit 6 into divided AC signals (FIG. 2(a)), and are sent to the comparator 7'. The comparator 7' compares the level of the divided AC signals from the dividing circuit 6 with the first threshold value Vth1, and if the level of the divided AC signals exceeds the first threshold value Vth1, the level of the synchronized pulse signals is inverted from the "L" level to the "H" level; and if the level of the divided AC signals falls below the second threshold value Vth2, the level of the synchronized pulse signals is inverted from the "H" level to the "L" level. Synchronized pulse signals like those indicated in FIG. 2(b) can thereby be obtained as output signals from the comparator 7'.

Figures 2A, 2B, 2C:
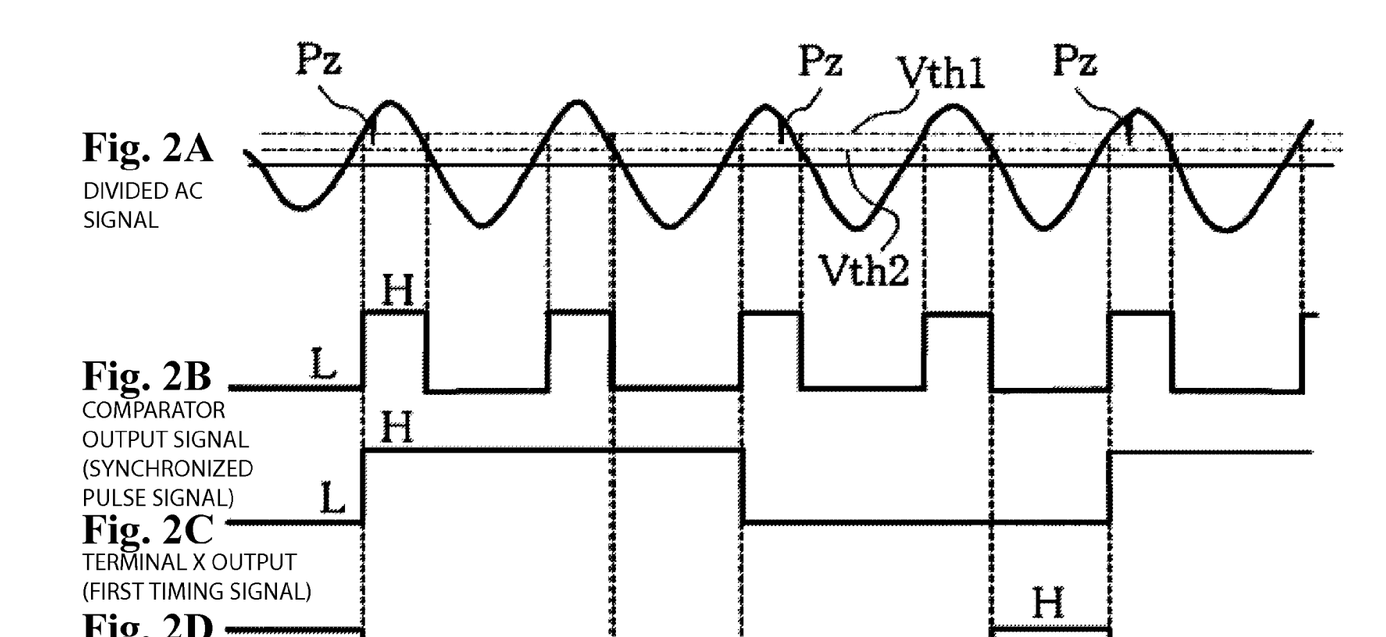
FIGS. 2(a)-2(e) are diagrams illustrating the signal waveforms of the various parts of the circuit configuration indicated in FIG. 1.
Figures 2D, 2E:
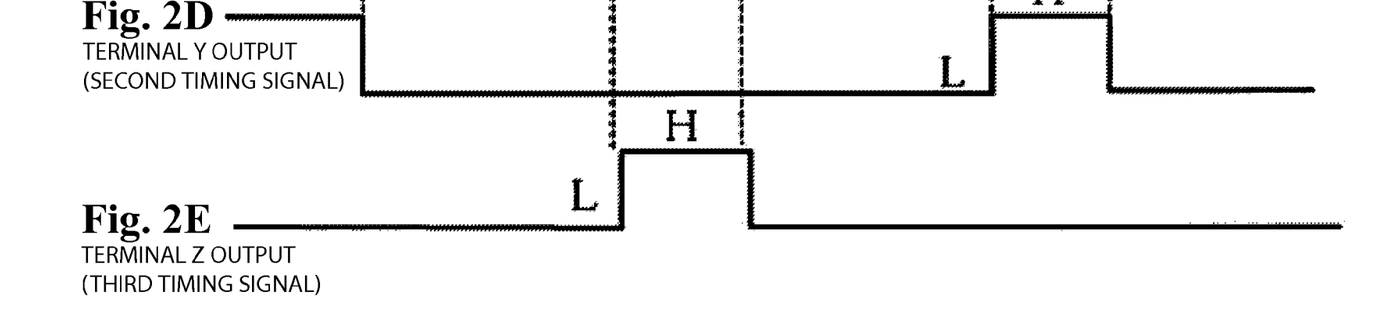

Some of these synchronized pulse signals are directly output to the timing circuit 9, and others are frequency-divided in even number multiples by the even-number frequency dividing circuit 8, and are then output to the timing circuit 9. As a result, as indicated in FIG. 2(c), the frequency-divided synchronized pulse signals from the even-number frequency dividing circuit 8 are output unchanged from the terminal X of the timing circuit 9 as first timing signals, and the direction of the exciting current to the exciting coil is switched by these first timing signals. Moreover, signals like those indicated in FIG. 2(d) are output from the terminal Y of the timing circuit 9 as the second timing signals, and signals like those indicated in FIG. 2(e) are output from the terminal Z of the timing circuit 9 as the third timing signals. Sampling of flow rate signals produced between the signal electrodes is conducted based on these second and third timing signals.

In this first embodiment, after the level of the divided AC signal exceeds the first threshold value Vth1 and the level of the synchronized pulse signal is inverted from the "L" level to the "H" level, if the level of the divided AC signal does not fall below the second threshold value Vth2, which is lower that the first threshold value Vth1, the level of the synchronized pulse signal is not inverted from the "H" level to the "L" level. Moreover, after the level of the divided AC signal falls below the second threshold value Vth2 and the level of the synchronized pulse signal is inverted from the "H" level to the "L" level, if the level of the divided AC signal does not exceed the first threshold value Vth1, which is higher than the second threshold value Vth2, the level of the synchronized pulse signal is not inverted from the "L" level to the "H" level. Therefore, erroneous switching of the level of the synchronized pulse signal due to minor fluctuations of the power source voltage can be prevented by making a large difference $\Delta Vth$ ($\Delta Vth=Vth1-Vth2$) between the first threshold value Vth1 and the second threshold value Vth2.

Specifically, hysteresis is provided to the action of the comparator 7' based on the difference $\Delta Vth$ between the first threshold value Vth1 and the second threshold value Vth2. By making this difference $\Delta Vth$ large, a large range can be made for power source voltage fluctuations that are not misjudged as one waveform. Thus, as indicated by code Pz in FIG. 2(a), for example, even if momentary fluctuations of the power source voltage are generated, they are unlikely to generate fluctuations of the frequency of the synchronized pulse signals, and the flow rate can be accurately measured.

Further, the threshold values Vth1 and Vth2 stipulate conditions under which no disruptions will affect the generation of synchronizing pulse signals, and preferably the difference $\Delta Vth$ between the threshold values Vth1 and Vth2 stipulates as large a value as possible under those conditions.

Structure and Operation of a Second Embodiment

Figure 3:
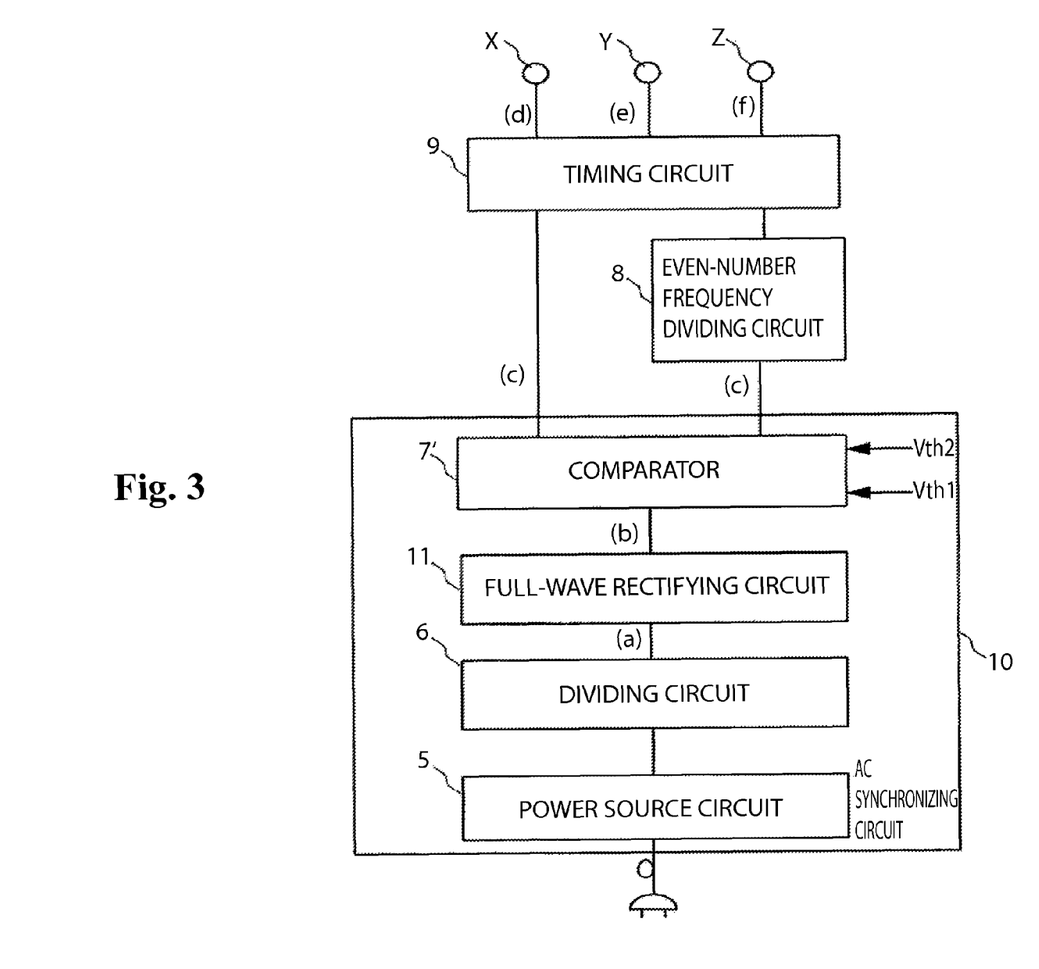
FIG. 3 is a diagram indicating another example of a circuit configuration that includes an AC synchronizing circuit of an electromagnetic flowmeter related to the present invention.

FIG. 3 is a diagram illustrating a second embodiment of a circuit configuration including the AC synchronizing circuit of an electromagnetic flowmeter related to the present invention. In this second embodiment, a full-wave rectifying circuit 11 is provided between the dividing circuit 6 and the comparator 7', and divided AC signals that have undergone full-wave rectification by this full-wave rectifying circuit 11 are sent to the comparator 7' as full-wave rectified signals.

FIGS. 4(a)-4(f) illustrate the signal waveforms of the various parts in FIG. 3. In the circuit configuration indicated in FIG. 3, AC signals input from the commercial power source are sent to the dividing circuit 6 through the power source circuit 5, are divided by the dividing circuit 6 into divided AC signals (FIG. 4(a)), and are sent to the full-wave rectifying circuit 11. The full-wave rectifying circuit 11 full-wave rectifies the divided AC signals from the dividing circuit 6, and sends these divided AC signals that have undergone full-wave rectification to the comparator 7' as full-wave rectified signals (FIG. 4(b)).

The comparator 7' compares the level of the full-wave rectified signals from the dividing circuit 6 with the first threshold value Vth1, and if the level of the full-wave rectified signals exceeds the first threshold value Vth1, the level of the synchronized pulse signals is inverted from the "L" level to the "H" level; and if the level of the full-wave rectified signals falls below the second threshold value Vth2, the level of the synchronized pulse signals is inverted from the "H" level to the "L" level. Synchronized pulse signals like those indicated in FIG. 4(c) can thereby be obtained as output signals from the comparator 7'.

Figure 4A:
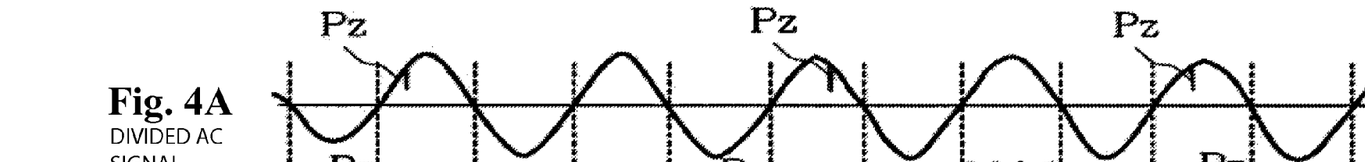
FIGS. 4(a)-4(f) are diagrams illustrating the signal waveforms of the various parts of the circuit configuration indicated in FIG. 3.
Figure 4B:
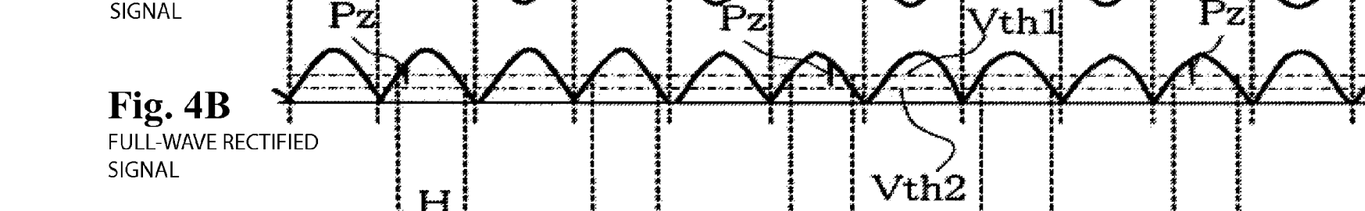
Figures 4C, 4D:
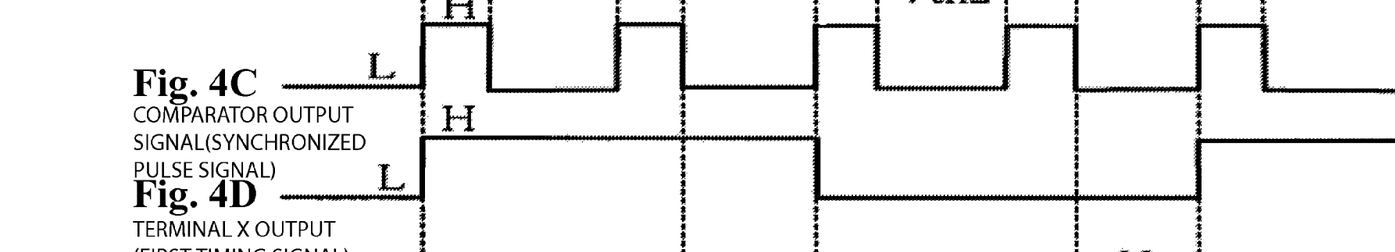
Figures 4E, 4F:
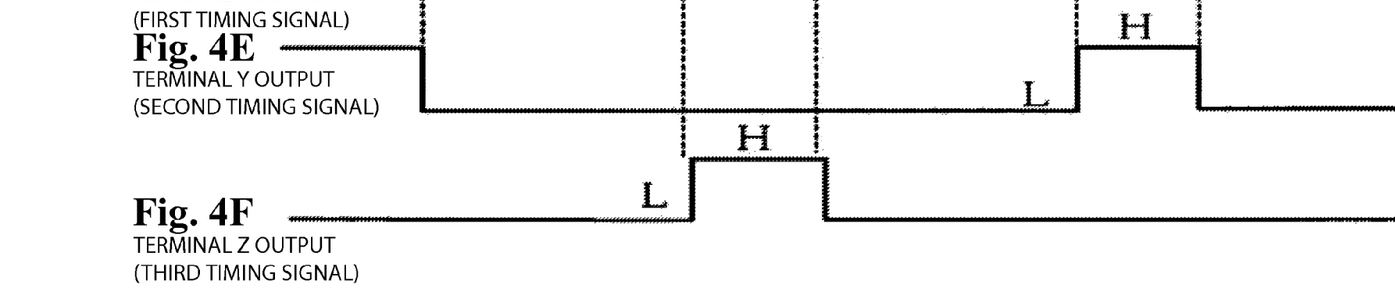

Some of these synchronized pulse signals are directly output to the timing circuit 9, and others are frequency-divided in even number multiples by the even-number frequency dividing circuit 8, and are then output to the timing circuit 9. As a result, as indicated in FIG. 4(d), the frequency divided synchronized pulse signals from the even-number frequency dividing circuit 8 are output unchanged from the terminal X of the timing circuit 9 as first timing signals, and the direction of the exciting current to the exciting coil is switched by these first timing signals. Moreover, signals like those indicated in FIG. 4(e) are output from the terminal Y of the timing circuit 9 as the second timing signals, and signals like those indicated in FIG. 4(f) are output from the terminal Z of the timing circuit 9 as the third timing signals. Sampling of flow rate signals produced between the signal electrodes is conducted based on these second and third timing signals.

In this second embodiment, after the level of the full-wave rectified signal exceeds the first threshold value Vth1 and the level of the synchronized pulse signal is inverted from the "L" level to the "H" level, if the level of the full-wave rectified signal does not fall below the second threshold value Vth2, which is lower than the first threshold value Vth1, the level of the synchronized pulse signal is not inverted from the "H" level to the "L" level. Moreover, after the level of the full-wave rectified signal falls below the second threshold value Vth2 and the level of the synchronized pulse signal is inverted from the "H" level to the "L" level, if the level of the full-wave rectified signal does not exceed the first threshold value Vth1, which is higher than the second threshold value Vth2, the level of the synchronized pulse signal is not inverted from the "L" level to the "H" level. Therefore, erroneous switching of the level of the synchronized pulse signal due to minor fluctuations of the power source voltage can be prevented by making a large difference $\Delta Vth$ ($\Delta Vth=Vth1-Vth2$) between the first threshold value Vth1 and the second threshold value Vth2. Thus, as indicated by code Pz in FIGS. 4(a) and 4(b), for example, even if momentary fluctuations of the power source voltage are generated, they are unlikely to generate fluctuations of the frequency of the synchronized pulse signals, and the flow rate can be accurately measured.

Structure and Operation of a Third Embodiment

Figure 5:
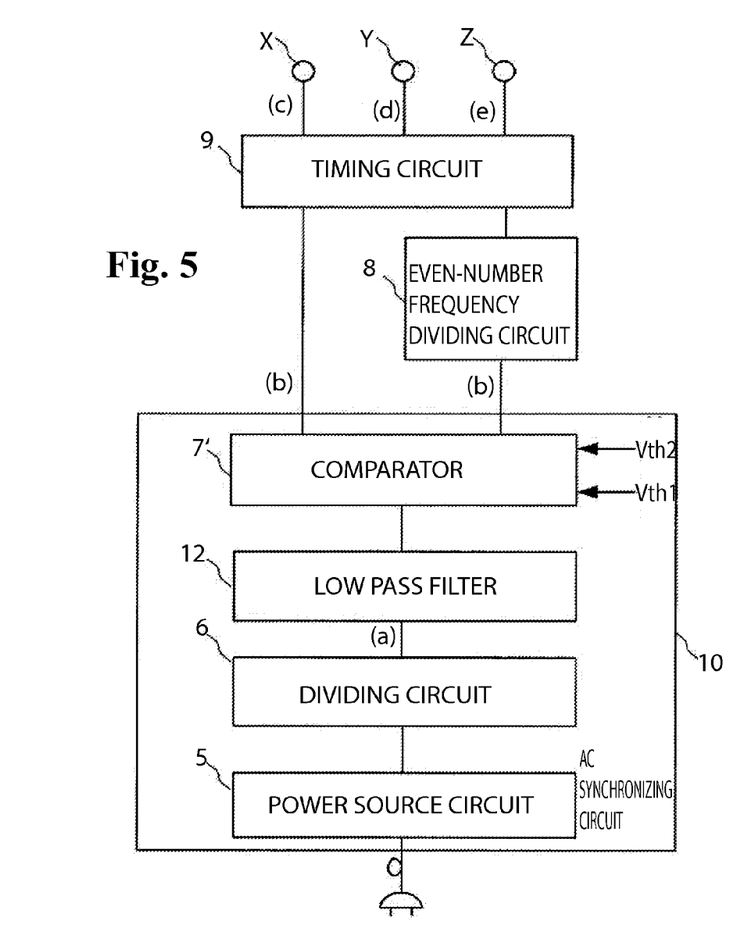
FIG. 5 is a diagram illustrating an example of providing a low pass filter between the dividing circuit and the comparator in the circuit configuration indicated in FIG. 1.

FIG. 5 is a diagram illustrating a third embodiment of a circuit configuration that includes an AC synchronizing circuit of an electromagnetic flowmeter related to the present invention. In this third embodiment, a low pass filter 12 is provided between the dividing circuit 6 and the comparator 7' of the configuration of the first illustrative embodiment, and this low pass filter removes signals included in the divided AC signals to the comparator 7' of a frequency higher than the frequency of the commercial power source. Signals with a frequency higher than the frequency of the commercial power source (high frequency noise) can thereby be removed by the low pass filter 12 prior to input into the comparator 7'. This strengthens the flowmeter against high frequency noise, allowing even more accurate flow rate measurements can be taken.

Structure and Operation of a Fourth Embodiment

Figure 6:
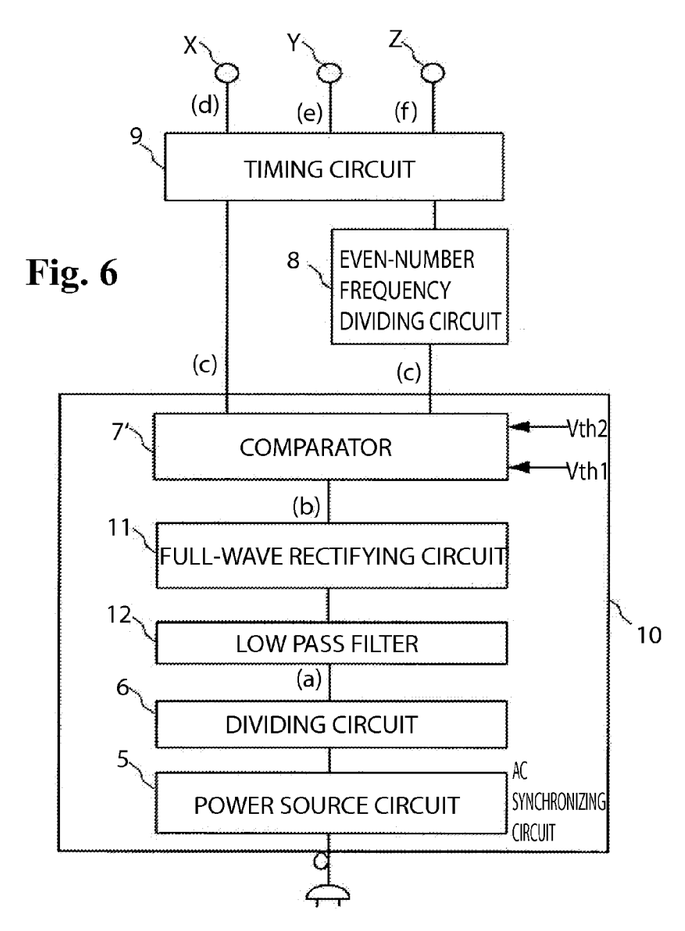
FIG. 6 is a diagram illustrating an example of providing a low pass filter between the dividing circuit and the full-wave rectifying circuit in the circuit configuration indicated in FIG. 3.
Figure 7:
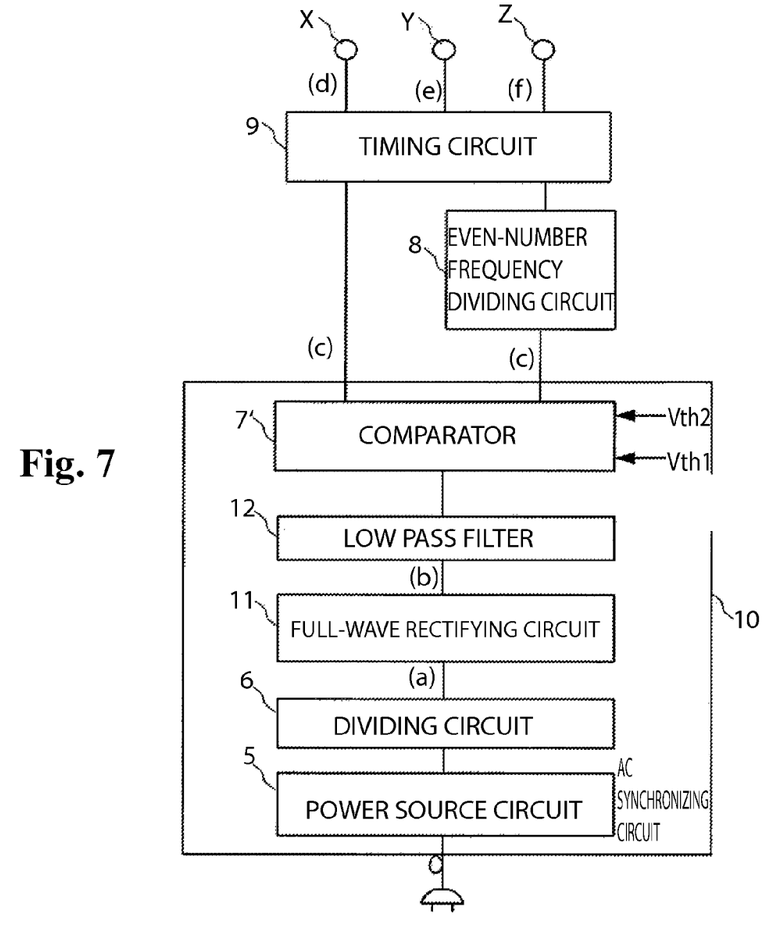
FIG. 7 is a diagram illustrating an example of providing a low pass filter between the full-wave rectifying circuit and the comparator in the circuit configuration indicated in FIG. 3.

FIG. 6 is a diagram illustrating a fourth embodiment of a circuit configuration that includes an AC synchronizing circuit of an electromagnetic flowmeter related to the present invention. In this fourth embodiment, a low pass filter 12 is provided between the dividing circuit 6 and the full-wave rectifying circuit 11 of the configuration of the second illustrative embodiment, and this low pass filter removes the high frequency noise included in the full-wave rectified signals to the comparator 7'. Further, as indicated in FIG. 7, the low pass filter 12 may be provided between the full-wave rectifying circuit 11 and the comparator 7' rather than between the dividing circuit 6 and the full-wave rectifying circuit 11 in order to remove the high-frequency noise included in the full-wave rectified signals to the comparator 7'.

I claim:

1. An electromagnetic flowmeter comprising:
    an exciting coil that creates a magnetic field orthogonal to the direction of fluid flow inside a measurement tube;
    a first signal electrode provided in the measurement tube facing orthogonally to the magnetic field created by the exciting coil;
    a second signal electrode provided in the measurement tube facing orthogonally to the magnetic field created by the exciting coil; and
    an AC synchronizing circuit that generates pulse signals synchronous to the frequency of a commercial power source, comprising:
        a dividing circuit that divides the AC signals input from the commercial power source into divided AC signals; and
        a comparator that monitors the level of the divided AC signals from this dividing circuit wherein, if the level of the divided AC signals exceeds a first threshold value, the levels of the pulse signals are inverted from the first level to a second level, and if the divided AC signals fall below a second threshold value, which is lower than the first threshold value, the levels of the pulse signals are inverted from the second level to the first level;
    wherein the switching of the exciting current that is supplied to the exciting coil and the sampling of flow rate signals produced between the signal electrodes are conducted at a timing that is controlled by the pulse signals produced by the AC synchronizing circuit.

2. The electromagnetic flowmeter of claim 1, wherein the AC synchronizing circuit further comprises a full-wave rectifying circuit that full-wave rectifies the divided AC signals from the dividing circuit into full-wave rectified signals.

3. The electromagnetic flowmeter of claim 1, wherein the AC synchronizing circuit further comprises a low pass filter that removes signals included in the divided AC signals that are of a frequency higher than the frequency of the commercial power source.

4. The electromagnetic flowmeter of claim 1, wherein the AC synchronizing circuit further comprises:
    a full-wave rectifying circuit that full-wave rectifies the divided AC signals from the dividing circuit into full-wave rectified signals; and
    a low pass filter that removes signals included in the full-wave rectified signals that are of a frequency higher than the frequency of the commercial power source.

* * * * *